(No Model.) 4 Sheets—Sheet 1.
J. G. DIXON.
FOG SIGNALING APPARATUS FOR RAILWAYS.
No. 567,380. Patented Sept. 8, 1896.
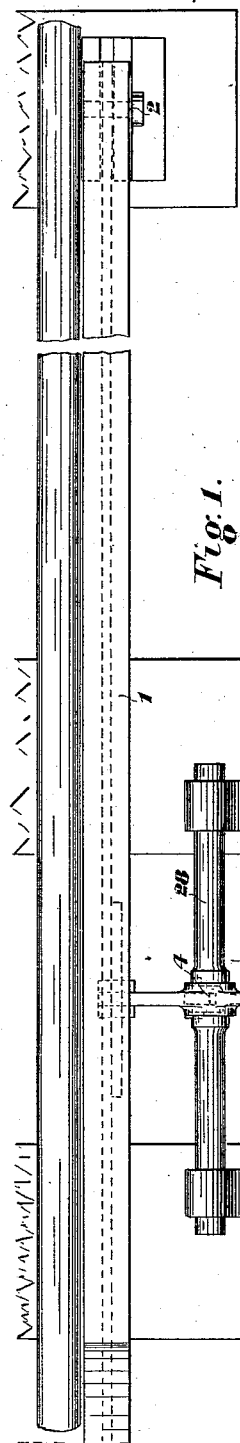
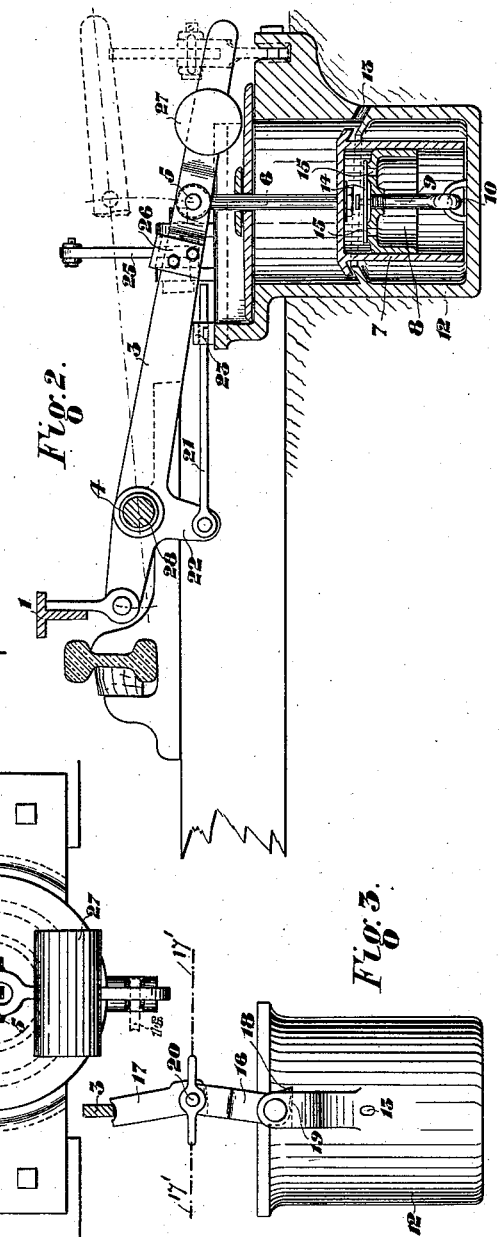
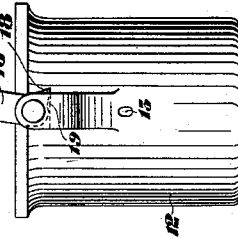
Witnesses:
Arthur Woodman.
Herbert G. Cratt.
Inventor
John G. Dixon.
per John D. O'Donnell
Attorney.
THE NORRIS PETERS CO., PHOTO-LITHO., WASHINGTON, D. C.

(No Model.) 4 Sheets—Sheet 2.
J. G. DIXON.
FOG SIGNALING APPARATUS FOR RAILWAYS.
No. 567,380. Patented Sept. 8, 1896.
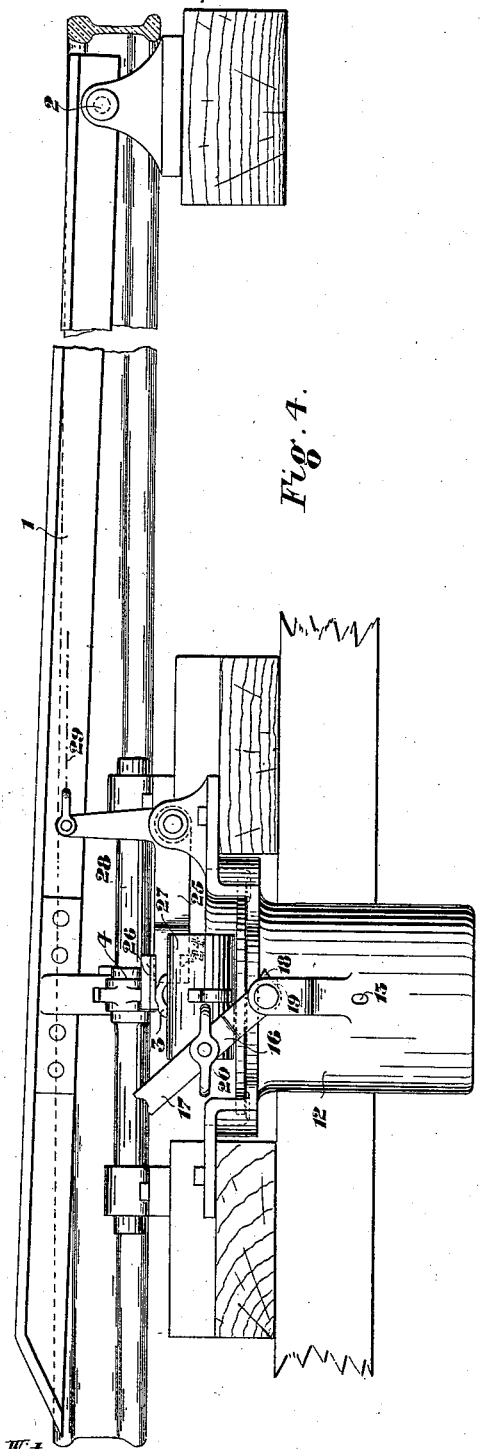
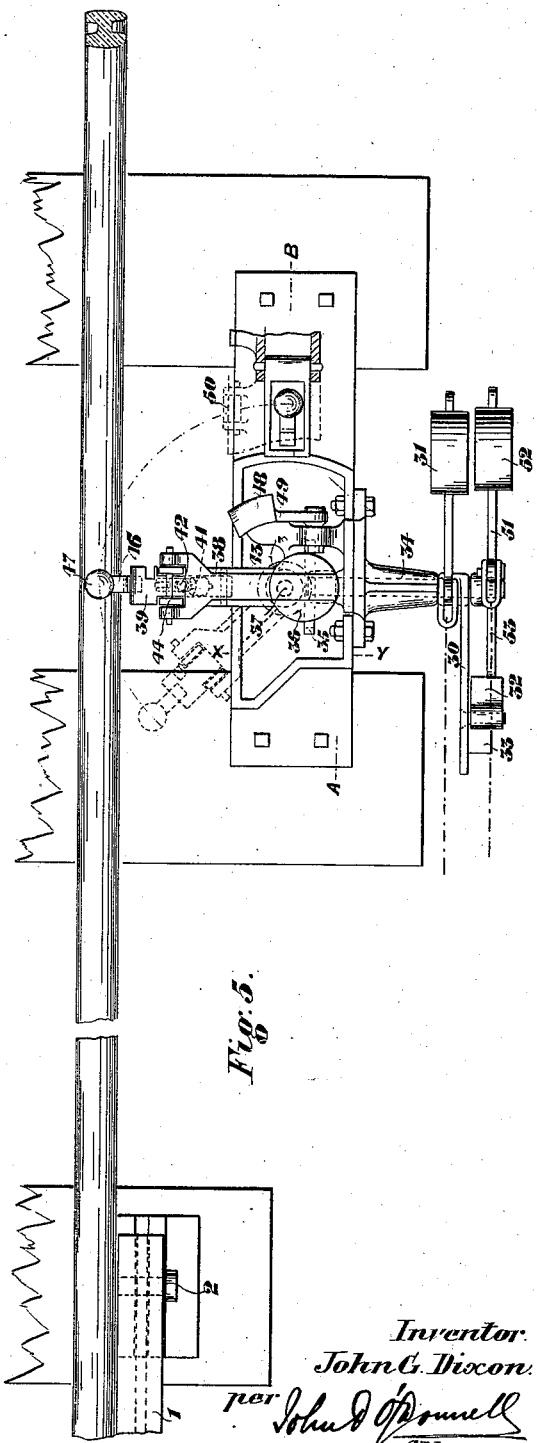
Witnesses: Arthur Woodman. Herbert G. Crabb.
Inventor. John G. Dixon. per John J. O'Donnell Attorney.

(No Model.) 4 Sheets—Sheet 3.

J. G. DIXON.
FOG SIGNALING APPARATUS FOR RAILWAYS.

No. 567,380. Patented Sept. 8, 1896.

Witnesses:—
Arthur Woodman.
Herbert G. Cra[...]

Inventor
John G. Dixon
per John D. O'Donnell
Attorney.

(No Model.) 4 Sheets—Sheet 4.

J. G. DIXON.
FOG SIGNALING APPARATUS FOR RAILWAYS.

No. 567,380. Patented Sept. 8, 1896.

Witnesses:-
Arthur Woodman.
Herbert G. Crabb.

Inventor
John G. Dixon.
per John D. O'Donnell
Attorney.

UNITED STATES PATENT OFFICE.

JOHN GEORGE DIXON, OF HUDDERSFIELD, ENGLAND.

FOG SIGNALING APPARATUS FOR RAILWAYS.

SPECIFICATION forming part of Letters Patent No. 567,380, dated September 8, 1896.

Application filed July 1, 1895. Serial No. 554,777. (No model.) Patented in England May 17, 1895, No. 9,808.

*To all whom it may concern:*

Be it known that I, JOHN GEORGE DIXON, a subject of the Queen of Great Britain and Ireland, residing at Ivy House, Lindley, Huddersfield, in the county of York, England, have invented new and useful Improvements in Fog Signaling Apparatus for Railways, (for which I have obtained a patent in England, No. 9,808, dated May 17, 1895,) of which the following is a specification.

My invention has reference to improvements in fog signaling apparatus on railways. The fog signals or detonators now generally used are placed on the rails by fogmen to indicate to drivers the locality of a signal and whether in the "danger" position. If a fog-signal has been placed on the line and the condition of the line is changed so that the section ahead has become clear, the signal being drawn to the "safety" attitude, the fogmen are accustomed to withdraw the detonator from the rail, placing it on again for the next "danger" signal. The risk is considerable, and the object of my invention is to arrange that each train in passing a signal or a given spot where detonators are desired to be used, explodes the detonator and resets my machine, placing another detonator on the line for the next train. If the signal is lowered to the "safety" attitude, the detonator is withdrawn from the line.

In order that my said invention may be better understood and more readily carried into effect, I will describe the drawings hereunto annexed.

Figure 6:
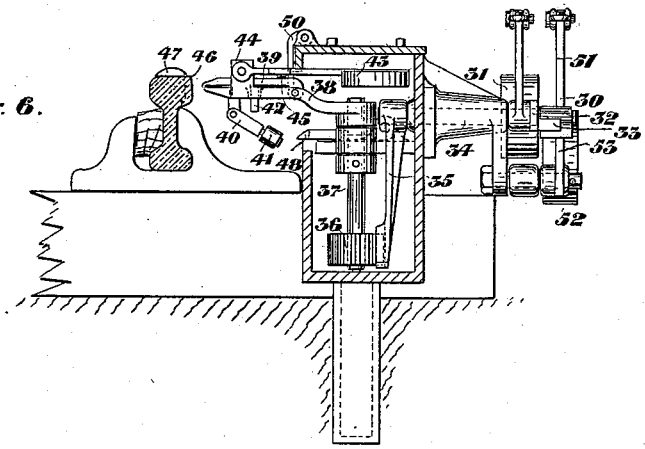
Figure 7:
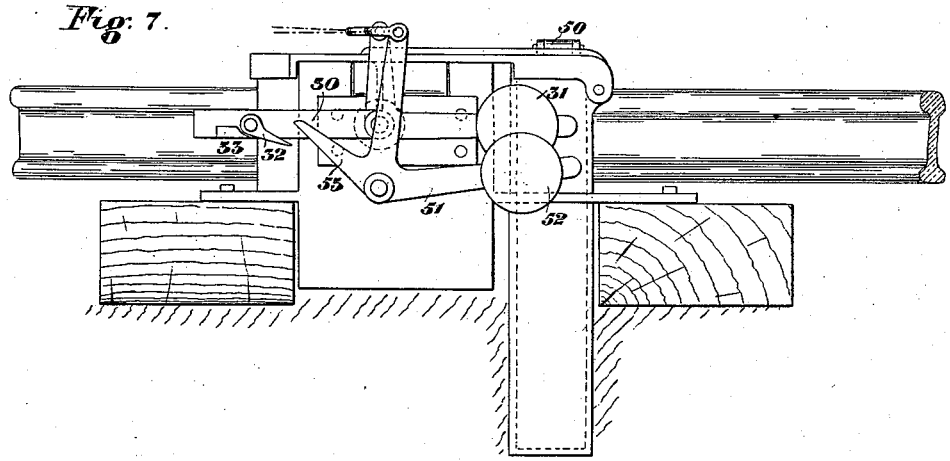
Figure 8:
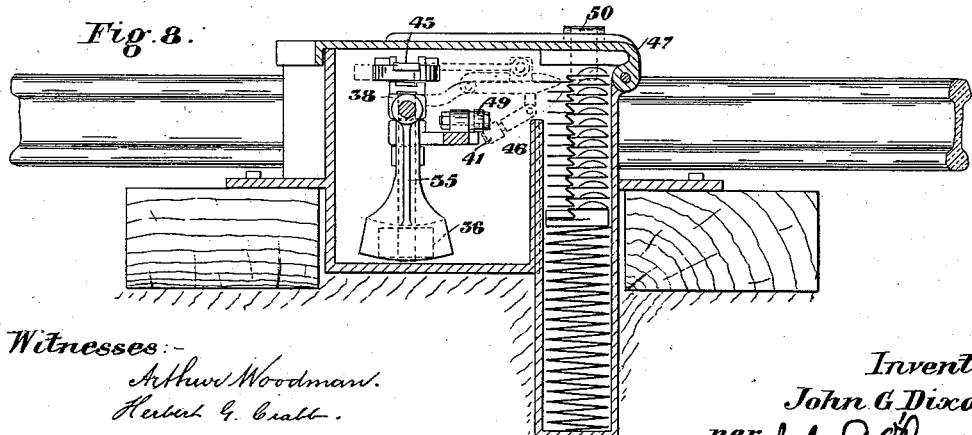
Figure 9:
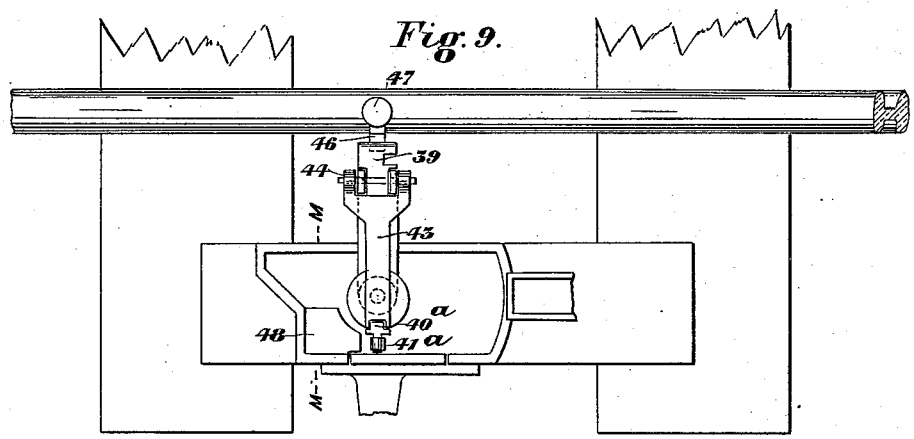
Figure 10:
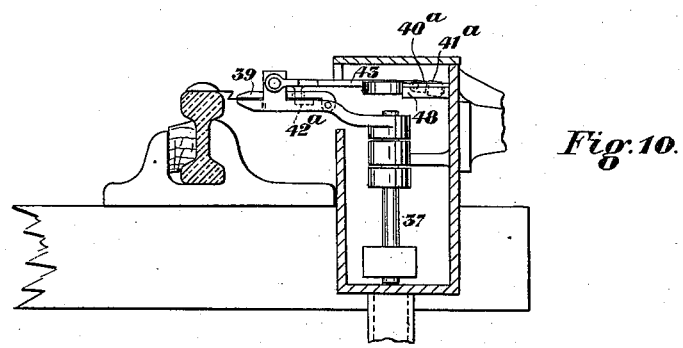
Figure 11:
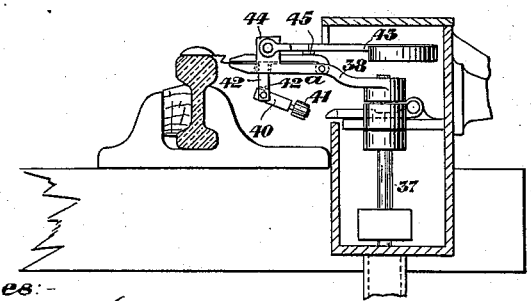

Figure 1, Sheet 1, is a plan on top of the dash-pot or cylinder and the connected parts. Fig. 2 is a sectional elevation through the dash-pot or cylinder, piston, and treadle. Fig. 3 is a front elevation of the dash-pot casting, showing the method of putting the apparatus in gear and out of gear. Fig. 4 is a side elevation of Fig. 1. Fig. 5 is a plan of the magazine and connected parts with the cover removed. Fig. 6 is a sectional elevation on line X Y, Fig. 5. Fig. 7 is a side view of Fig. 5. Fig. 8 is a sectional side view on line A B, Fig. 5, showing the jaws or clip in the magazine ready to move the detonator onto the rail. Fig. 9 is a modification of the mechanism for opening the jaws, allowing the spent detonator to fall and also enabling the jaws to clip a fresh detonator. The cam in this figure, through which the jaws are opened, is at the left-hand corner of the box farthest from the rail. Fig. 10 is a section on line V W, Fig. 9. Fig. 11 is a further modification for opening the jaws to allow the spent detonator to be dropped and a new one brought onto the rail.

The same numbers refer to the same parts in the several figures of the drawings.

1 is the treadle or bar fixed parallel to the rail, fulcrumed at 2.

3 is the transverse lever, attached to the bar 1, fulcrumed at 4, and connected at 5 to a rod 6, the latter working the dash-pot or cylinder 7.

8 is the piston.

9 is the piston-rod, fastened at its lower end 10 to the outer case 12.

13 is a hole to allow of the escape of water and prevent it getting into the cylinder.

14 is a valve.

15 15 are the valve-holes for the escape of air.

16 is the lower lever attached to the outer case, and 17 the upper lever for keeping the transverse lever 3 in the raised position, so that the detonator is off the rail and the machine out of use.

18 is the lip or projection which, coming in contact with the lower side 19 of the bracket on the casting, prevents 16 from falling or being moved to the right.

20 is the center connecting 16 and 17 together. The lower part of 17 is rounded and the upper part of 16 is also formed to receive the lower part of 17, so that when the wire 17', which extends in both directions, is pulled to the left, both 16 and 17 are moved with it, the upper part of 17 assuming a lower level, as in Fig. 4, allowing the transverse bar or lever 3 to fall, raising the bar 1, and putting the machine into gear. The levers 16 and 17 are restored to the positions shown in Fig. 3 after a passing train has depressed the treadle or the lever 3 has been raised by any other approved means. This is accomplished by pulling the wire 17' to the right. The wire 17' is continued in each direction to any convenient point or points from which it may be desired to control the action of the levers 16 and 17.

21 is a locking-rod attached to a projection 22 on the transverse lever 3. The rod 21 works through a guide 23, and when the signal-lever in the cabin is pulled over, wire or chain 29 is slackened and crank 25 falls by gravity, and the train on passing over the treadle-bar moves 21 forward onto a lower projection 24 on the crank 25, preventing the crank 25 from moving to allow the detonator 47 to go back onto the rail.

26 is a piece fixed on the upper side of the transverse lever 3, projecting over the lower arm of the crank 25 in the position shown in Fig. 4.

27 is an additional weight on the transverse lever 3, but such weight may be dispensed with if the cylinder is made an equivalent increased weight, the cylinder acting as a counterbalance to the treadle 1.

28 is the rocking shaft upon which the transverse lever is fixed.

29 is a wire connecting the crank 25 to the T-lever 30.

31 is the balance-weight on the lever 30.

32 is a pawl on lever 30, prevented by a stop 33 from being moved downward, but the said pawl may move upward. The lever 30 is keyed to a shaft 34, on the other end of which shaft is an arm or lever projecting downward and terminating in teeth forming a rack 35. In gear with this rack is a pinion 36; the pinion is also fastened to a vertical shaft 37. Keyed to the upper part of the shaft is the lower jaw 38, and centered to the lower jaw is the upper jaw 39. Centered to a projection on the lower jaw, Fig. 6, is a small lever 40, terminating in a friction-roller 41. A projection 42 from the upper jaw passes through a hole in the lower jaw. A balance lever and weight 43 is centered to a projection 44 from the lower jaw, and it rests upon the upper jaw at point 45, keeping the jaws tight together for gripping the detonator-clip.

46 is the detonator-clip, and 47 the detonator.

48 is a cam upon which the roller 41 moves when the jaws are moved away from the rail toward the magazine.

49 is the lowered part beyond the cam, to which the friction-roller may fall, closing the jaws when the latter have arrived opposite the detonators, so as to get a firm grip for moving the next detonator onto the rail.

50 is a flap centered to the top of the case containing the mechanism of the magazine, which cannot be moved into the magazine, and therefore offers an obstruction knocking out the spent detonator from the jaws. The jaws are free to move into the magazine, but the extra length caused by the detonator and clip finds an obstruction in the flap, and by that means the spent detonator is knocked out. On the jaws coming out of the magazine with a new detonator the flap is raised, being capable of moving outward, and falls back again when the jaws and detonator have passed free toward the rail.

51 is a lever attached to the signal-wire operating the signal to which the detonator is intended to refer; its balance-weight is 52. The arm 53 is intended to come in contact with the pawl 32 to move the balance-lever 30, thereby communicating motion to the jaws and detonator.

The working of my invention is as follows: In the normal position, assuming the semaphore-signal to be at "danger," a detonator will be on top of the rail, as shown in Fig. 5, and the treadle-bar will be raised, as shown in Figs. 1 to 4. The train in moving toward the machine travels over the detonator first, explodes it, and depresses the treadle. This action raises the other end of the transverse lever 3 and cylinder 7. The raising of the transverse lever frees the lower arm of the crank 25 by the projecting piece 26 being moved upward. By freeing the crank 25 the balance-lever 30 draws the wire 29 connected to lever 25, moving the latter lever and raising the lower arm. On lever 30 being moved through its balance-weight the shaft 34 is turned, and through the downward-projecting arm 35 being geared to the pinion 36 the pinion is revolved. The upright vertical shaft 37 is also revolved and in their turn the jaws and spent detonator are moved to the right (plan, Fig. 8) into the magazine. In passing the flap 50 the spent detonator is discharged, but previously the jaws have been opened by the friction-roller 41 thrusting upward the projection 42 attached to the upper jaw 39. When the spent detonator has been discharged by the flap 50, the friction-roller 41 has fallen to the lower level 49, the new detonator is between the jaws, the dropping of 41 onto 49 closes the jaws, and when the last wheel has passed over the treadle-bar 1 the air in the cylinder escapes through the valve-holes 15. The cylinder acting as a balance-weight lowers the transverse lever, raises the treadle, brings the projecting piece 26 over the lower arm of the crank 25, forces the lower arm downward, tightens the chain or wire 29, brings the lever 30 into its normal position, (shown in Fig. 7,) the lever 30 going through the previously-described movement of operating 35, that in its turn moving the pinion 36, the latter, through the shaft, moving the jaws and detonator onto the rails, as shown in Fig. 5, ready for the next train. All these movements, it will be noted, have been independent of the signalman, the signal remaining at "danger" the whole time.

The machine, when the signal is kept in the "danger" attitude for a succession of trains, is perfectly automatic, one train setting the machine and putting a detonator on the rail for the next succeeding train. If, however, the signalman wishes to lower his semaphore-arm to the "safety" attitude, it is well understood that the detonator should also be removed from the rail, otherwise there would be contradiction of signals. As the lever 51 is attached to the wire operating the semaphore-arm, the signalman in working the semaphore-arm to the "safety" attitude moves lever 51, lever 51 in turn through its arm 53 operates, lever 30 in the opposite direction to that previously described, that is to say, the weight is moved upward and the shaft 34, pinion 36, vertical shaft 37, jaws, and detonator are all moved, the latter to the left, away from the rail, so that the fog-signal is in conformity with the semaphore-arm. After the passage of the train, on the signalman replacing the signal to the "danger" attitude, the machine goes through a similar return operation and the detonator is placed on the rail in the position shown in Fig. 5. In order, however, to prevent the signalman from putting his lever back and the signal to "danger" before the train has passed clear of the treadle-bar, by which action he would put a detonator on the rail when it was not required, when the signalman pulled over his operating-lever in the cabin moving the lever 51, it in its turn moved lever 30 and slackened wire 29, and crank 25 fell by gravity. Now, when the train passes over the treadle bar, 1 and operates the transverse lever 3, the locking-rod 21 is moved above and to obstruct the passage of the projection 24 on the lower side of the crank 25. By this action the return of the crank 25 to the normal position, as shown in Fig. 4, is prevented; consequently the jaws and detonator cannot return to the normal position and the detonator itself cannot be placed on the rail, being held to the left-hand worked-off position by the locking-rod 21 locking the crank 25.

The advantage of the piston and cylinder used in this application is well known, as the principle has been described in my former specification of Letters Patent of the United States No. 509,796, dated November 28, 1893. The modification in this instance is that the piston is a fixture to the bottom of an outer case, the piston being capable of oscillation with the cylinder, the cylinder acting as a counterbalance-weight.

My present invention consists, generally, in improvements on the invention described in the specification of United States Letters Patent granted to me, No. 509,796, dated November 28, 1893, hereinbefore referred to.

As hereinbefore stated, Figs. 9, 10, and 11 are modifications of the mechanism for opening the jaws of my machine. In Fig. 10, 42ª is an L-piece projecting down from the balance-lever through the top jaw, and 40ª is the equivalent of 40 in Fig. 6, being placed at the end of the balance-lever, instead of projecting from the lower jaw 33. The friction-roller 41ª in moving up the cam 40ª raises the balance-lever 43 and the L-piece 42 raises the upper jaw 39. The modification in Fig. 11, different from Fig. 6, is that the downward projection 42 from the upper jaw is used to support the lever 40 and the friction-roller 41, instead of having a separate bracket depending from the lower jaw. The straight surface 42ª in 42, on 41 moving up the cam, prevents 40 from further revolving and forces up the upper jaw.

In my prior specification of Letters Patent, above cited, there were illustrated a feeding-arm and upper and lower jaws and a counterbalance-lever operated by the signal-lever in the cabin. There were also illustrated springs in connection with the magazine and feeding mechanism. In my present invention I have abolished such springs and substituted weights.

I wish it to be distinctly understood that I claim nothing described or claimed in my former specification of Letters Patent, No. 509,796, of A. D. 1893, above referred to.

Although the description and illustrations herein show an automatic fog-signal apparatus, yet, if desirable, the feeding-jaw mechanism and magazine might be used without the treadle-bar and its connections. In this application the detonator would follow the movement of the semaphore-arm to which it applied. It would be normally on the line when the signal is at "Danger" and would be drawn off the line to the magazine when the signal is lowered to the "safety" attitude. It is obvious, however, that it would be necessary to either work the signal for every train or to work a separate lever interlocked with the signal-lever, so that the special fog-signal lever would release the signal-lever for every forward movement of the latter moving the semaphore-arm to the "safety" attitude, but would be specially interlocked in the well-known manner in the profession, so that the fog-signal lever could not be left normally over, that is to say, normally worked, so that the signal-lever could be operated any number of times without the fog-signal lever being worked. For every time the signal is placed to "Danger" a detonator would have to be previously placed on the line.

Having fully described my invention, what I claim, and desire to secure by Letters Patent, is—

1. The combination, with a treadle, of a pivoted lever arranged transversely of the treadle and connected with it at one end, a stationary outer case provided with air-escape holes, a piston pivotally connected with the bottom of the case and provided at its top with a valve opening upward, a weighted dash-pot cylinder slidable over the said piston, and a rod secured to the said cylinder and pivoted to the said lever, said cylinder operating to raise the treadle slowly and automatically, substantially as set forth.

2. The combination, with a treadle, and a pivoted transverse lever 3 connected direct to the free end of the treadle, and provided with a weight 27 for raising the treadle, and a lateral projection 26; of a pivoted bell-crank lever 25 having the end of its horizontal arm arranged under the said projection 26, detonator-supply mechanism arranged at a distance from the said treadle, and a chain connecting the vertical arm of the said bell-crank lever with the said supply mechanism and affording a means for controlling it, substantially as set forth.

3. The combination, with a treadle, and a pivoted transverse lever 3 connected direct to the free end of the treadle, and provided with a weight 27 for raising the treadle, a downwardly-projecting arm 22, and a lateral projection 26; of a pivoted bell-crank lever 25 having the end of its horizontal arm arranged under the said projection 26, and provided with a projection 24; a locking-rod 21 pivoted to the arm 22 and engaging with the projection 24 when the said treadle is depressed, detonator-supply mechanism arranged at a distance from the treadle, and a chain connecting the vertical arm of the said bell-crank lever with the said supply mechanism and affording a means for controlling it, substantially as set forth.

4. The combination, with a treadle, a pivoted transverse lever connected thereto, and means for raising the said treadle slowly and automatically; of a stationary support provided with a stop 19, a lever 16 provided with a projection 18 for bearing against the said stop, a lever 17 pivoted to the lever 16 and affording a support for the free end of the said transverse lever, and an operating device—such as a wire 17' extending in both directions—connected to the pivot between the levers 16 and 17 and affording a means for placing them in or out of a position to support the said transverse lever, substantially as set forth.

5. The combination, with the shaft 37, and means for oscillating it; of the lower gripper-jaw secured to the said shaft, the upper jaw pivoted to the lower jaw and provided with a projection 42, a lever pivoted to the lower jaw under the said projection, and a pivoted cam operating to raise the said lever and upper jaw when the shaft is turned in one direction to release an exploded detonator, and permitting the said lever and upper jaw to pass back without rising when the said shaft is turned back to its original position, substantially as set forth.

6. The combination, with a detonator-magazine provided with a hinged flap at its entrance, said flap opening outward; of an oscillatory shaft 37, gripper-jaws carried by the said shaft, means for pressing the gripper-jaws together automatically to hold a detonator in position, and automatic tripping devices operating to separate the jaws before they pass the said flap on entering the said magazine, substantially as set forth, whereby the exploded detonator is disposed of.

JOHN GEORGE DIXON.

Witnesses:
HERBERT FITZROY CLAYTON,
DAVID JAMES BAILEY.